Oct. 12, 1948.  W. V. BAULT  2,450,931
CHUCK
Filed Dec. 27, 1945   3 Sheets-Sheet 1

William V. Bault
INVENTOR.

BY Milo B. Stevens & Co.

Attorneys.

Oct. 12, 1948. W. V. BAULT 2,450,931
CHUCK
Filed Dec. 27, 1945 3 Sheets-Sheet 2

William V. Bault
INVENTOR.

BY Milo B. Stevens & Co.

Attorneys.

Oct. 12, 1948.　　　　W. V. BAULT　　　　2,450,931
CHUCK
Filed Dec. 27, 1945　　　　　　　　　　3 Sheets-Sheet 3
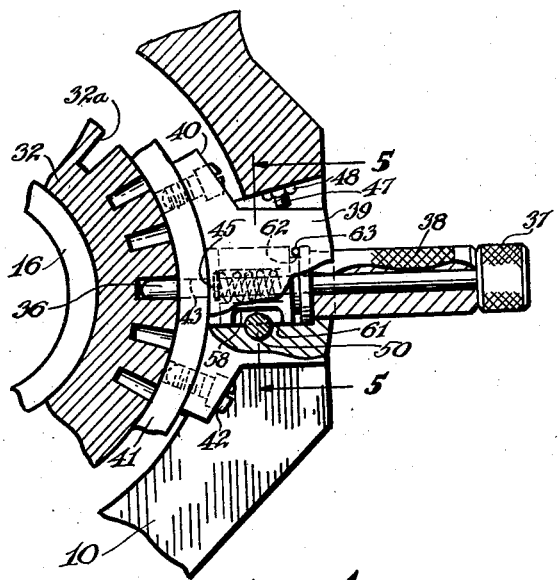
Fig. 4
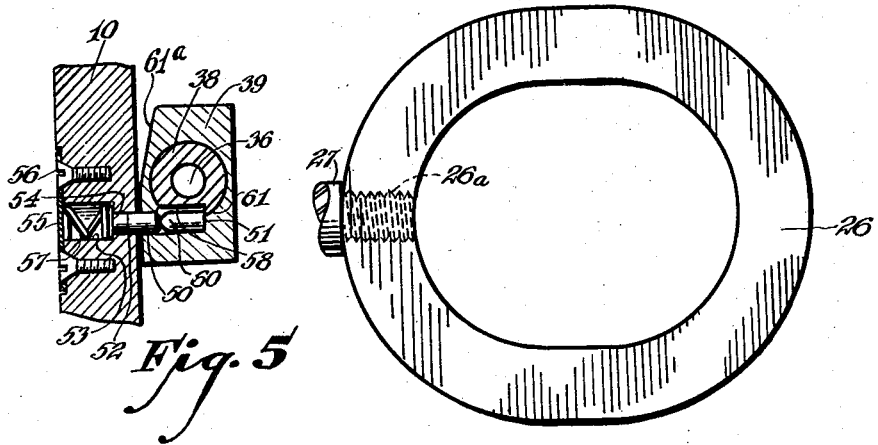
Fig. 5
Fig. 6
William V. Bault
INVENTOR.
BY Milo B. Stevens & Co.
Attorneys.

Patented Oct. 12, 1948

2,450,931

UNITED STATES PATENT OFFICE 2,450,931

CHUCK

William V. Bault, Watseka, Ill.

Application December 27, 1945, Serial No. 637,341

10 Claims. (Cl. 90—56)

My invention relates to means for holding and positioning work for such operations as milling, drilling, tapping and slotting, and involves a chuck which includes a standard spring collet in which the work is held.

One object of the invention is to provide a chuck of the character mentioned which may be applied to the lathe, shaper or operative machine to position the work either vertically or horizontally, and which includes positive means to clamp the collet to the work with a tight grip.

A further object is to employ dual wedge means at a highly favorable leverage to procure the clamping application of the collet.

Another object is to mount the collet in a center piece which is rotatable to turn the work to any chosen point or angle and to fix it at such point or angle.

A still further object is to provide a hand control for procuring a partial turn of the work or to position the same at any one of a number of steps in such partial turn.

An important object is to construct the novel chuck along lines of ruggedness, compactness and simplicity.

With the above objects in view and any others which may suggest themselves from the description to follow, a better understanding of the invention may be had by reference to the accompanying drawings, in which—

Figure 3:
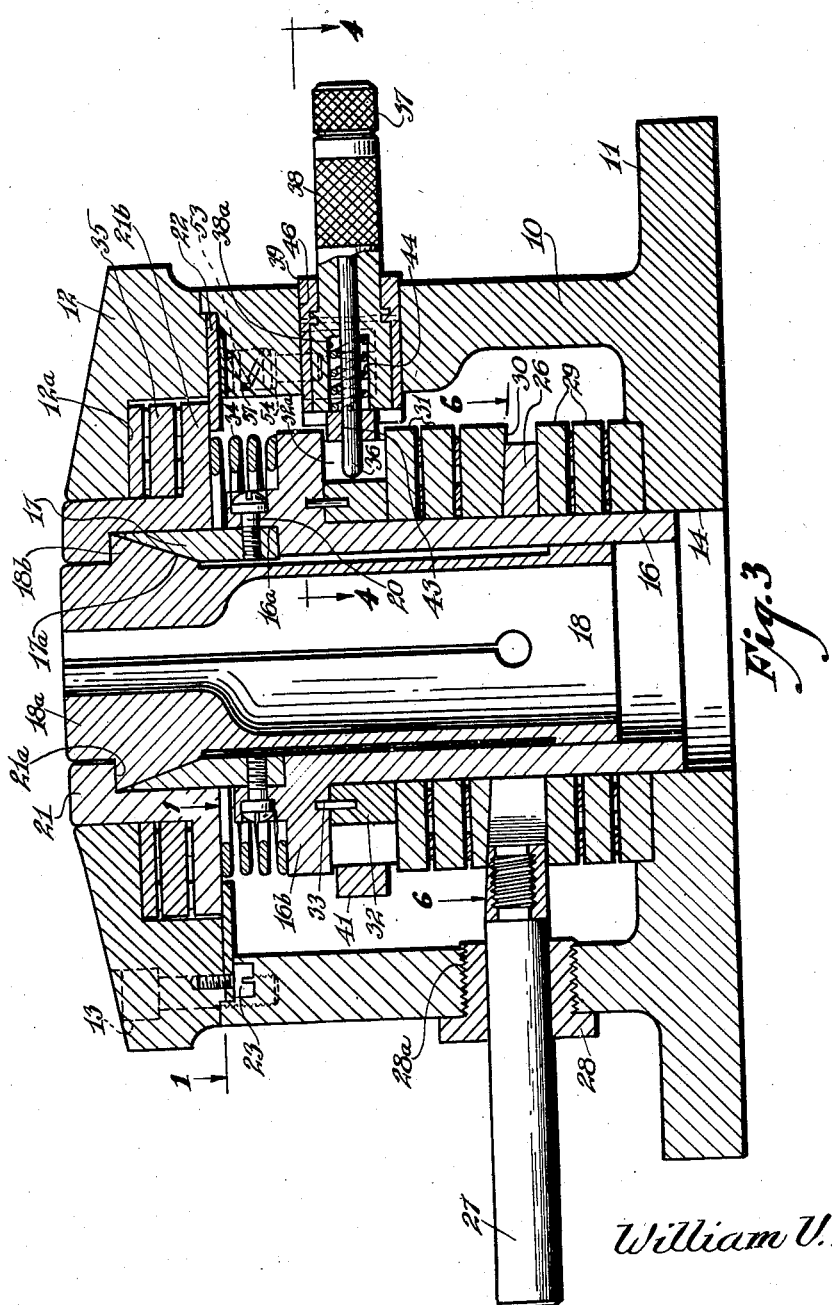
Fig. 3 is a section on the line 3—3 of Fig. 1.

Figs. 4 and 6 are, respectively, sections on the lines 4—4 and 6—6 of Fig. 3; and Fig. 5 is a section on the line 5—5 of Fig. 4.

In accordance with the foregoing, specific reference to the drawings indicates the housing of the novel chuck at 10, the same having a base 11 applicable to the lathe, milling machine or operative structure; and the housing receives a headpiece 12 by means of a set of securing bolts 13.

The housing has a center bore 14 to slidably dispose an axial sleeve 16 from which extends a forward continuation in the form of a ring 17. The sleeve and ring receive a standard split-type collet 18 on the inside. The ring 17 seats in an annular offset 16a of the sleeve 16 and receives four screws 20 from the same to secure the ring rigidly to the sleeve. The head 18a of the collet has a flared marginal enlargement 18b; and the ring 17 is beveled in forward direction as indicated at 17a to fit the flare of the enlargement 18b. Thus, the forward movement of the sleeve and ring will act wedgingly against the collet to constrict the same and clamp such work as it may contain.

The ring 17 is confined in and guided by a sturdy cup-like retainer 21 disposed in the center of the headpiece 12 and having an internal shoulder 21a at its forward end forming a stop for the collet enlargement 18b. At its rear end the retainer has a wide base flange 21b over a rearwardly-opening cavity 12a in the headpiece. The retainer is held in the latter by the application of a pair of diametrically-positioned plates 22, whose inner ends underlie the rear face of the retainer flange 21b, the outer ends of the plates being secured by screws 23 to the headpiece.

Operative movement of the beveled clamping ring 17 is effected by cooperating wedge means. Thus, an elliptical wedge 26 is disposed around the sleeve 16, and is tapped in one end as indicated at 26a to receive a handle 27. The latter extends through a bushing 28 to the outside of the housing, the bushing threading into the wall of the housing as indicated at 28a. The wedge 26 is shown in the normal or retracted position; but it may be advanced by pushing the handle 27 inwardly.

A roller bearing 29 is interposed between the rear or base side of the wedge 26 and the housing base 11; and a cooperating wedge ring 30 lies against the forward or beveled side of the wedge. The wedge 26 is shown in the normal or retracted position; but it may be advanced by pushing the handle 27 inwardly.

The ring 30 receives a roller bearing 31 in front, this bearing being followed by a ring 32 which is keyed at 33 to a flange 16b extending outwardly from the sleeve offset 16a. A compression spring 34 is positioned between this flange and the retainer flange 21b; and a roller bearing 35 is interposed between the retainer flange and the floor of the cavity 12a.

It is now seen that the compression spring 34 serves not only to bear forwardly on the retainer 21 but also to maintain the wedge ring 30 in engagement with the wedge 26. However, when the latter is advanced, it acts positively through the bearing 31, ring 32 and sleeve 16 to actuate the clamping ring 17. Due to the highly favorable leverage obtained by the dual wedge means, only a small amount of effort will be required to operate the handle 27 as stated; and this may be done manually, by air pressure, or by other suitable mechanical means.

Since the work is rotatable by means of the central assembly, indexing means are provided to locate the work at any one of a number of positions in its path of rotation. Thus, the ring 32 is made with a series of radial slots 32a in its margin, any one of which may receive a plunger 36 directed through the side of the housing and having a knob 37 at its outer end. The plunger 36 is slidable in a radial lever 38, whose inner portion is fitted into a base 39. The latter is provided with side wings 40 at its inner end; and such end is of concave form to receive a portion of a ring 41 which encircles the ring 32. The latter is freely rotatable in the ring 41; and this ring is supported from the lever base 39 by screws 42 threading into it from the side wings 40. On its inward course, the plunger 36 passes through a cavity 38a in the inner end of the lever 38 and a bore 43 in the ring 41. A coil spring 44 in the cavity bears against a cross-pin 45 carried by the plunger with the effect of urging the latter in the inward direction. Thus, Fig. 3 shows the indexing ring 32 locked from rotation by the seating of the plunger 36 in one of the slots 32a. It follows, now, that the withdrawal of the knob 37 will retract the plunger from the indexing ring and permit the lever assembly to be advanced to a point where the release of the plunger 36 will again lock the indexing ring and work support to the lever, so that the same may be reversed to rotate the work to a desired new position.

Figure 1:
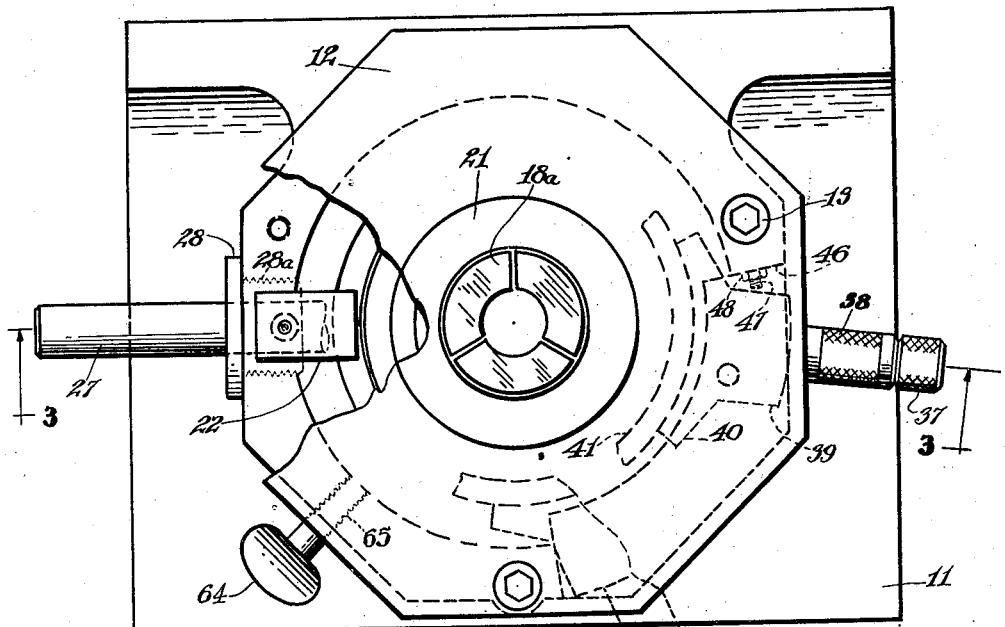
Fig. 1 is a top plan view of the chuck, partly broken away, on the line 1—1 of Fig. 3.
Figure 2:
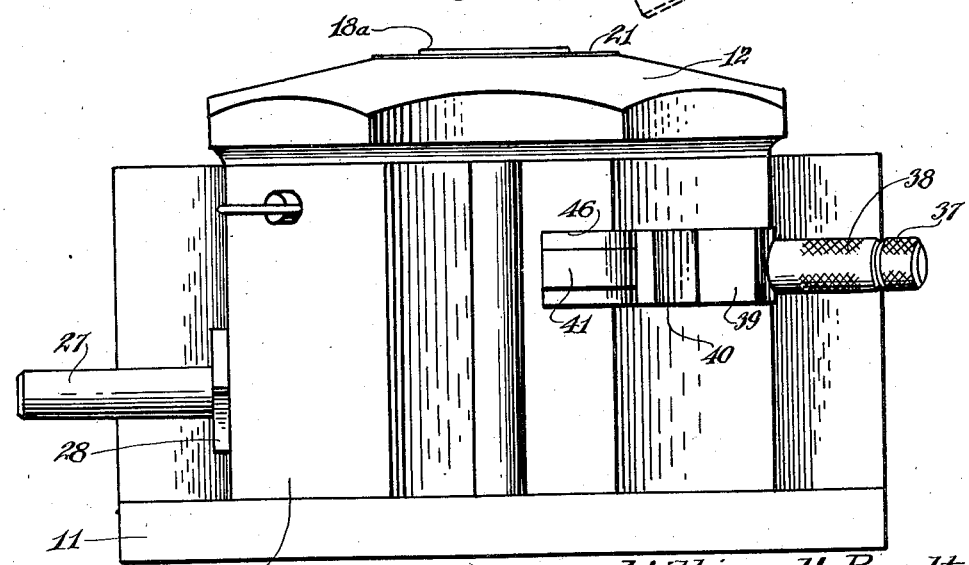
Fig. 2 is a front elevation.

Figs. 1 and 4 indicate that the base 39 of the radial lever 38 is located in a side opening 46 in the housing 10, such opening having a width of approximately 90 degrees. Thus, with the lever 38 locked to the indexing ring 32 by means of the plunger 36, it is possible to turn the work partway by means of the lever or to turn it in successive steps by retracting the plunger after each forward stroke of the lever and returning the latter for a new hold on the indexing ring. The latter is of course interchangeable for one with slots at different intervals according to the requirements of the control. To suit this factor a variable backing stop for the lever base is provided in the form of a screw 47 threaded into the wall of the housing and secured by a lock nut 48.

When the work has been turned to the desired position and clamped by the wedge means previously described, it is necessary to lock it from rotation in either direction; and this is done by locking the lever base 39 to the housing 10. Thus, Fig. 5 shows that such base has a vertical plunger 50 whose lower portion is disposed in a pocket 51 in the base 39, while the upper portion of the plunger is located in a bore 52 made in the housing portion located above the opening 46. The upper end of the bore opens on a larger bore 53; and the plunger has an enlarged head 54 normally resting in the bottom of the bore 53. The upper end of the latter is open and receives a lid 55 secured flushly in the upper end of the housing by screws 56. A compression spring 57 extends between the lid 55 and the plunger head 54. The lever 38 has a side recess 58 opposite a push pin 60 located below the plunger 50; and the push pin 60 also extends over a hook 61 projecting laterally from the lever 38.

With the parts just described in the positions shown, the plunger 50 serves in the manner of a lock tumbler to check the lateral movement of the lever 38 in relation to the housing, so that the work in the collet is thus maintained in a fixed position. However, when the work is to be rotated a partial twist of the lever in the clockwise direction—per Fig. 5—will cause the hook 61 to raise the push-pin 60 and in turn the plunger 50 until the latter clears the lever base 39, so that the lever may be swung in the left-hand direction. On the return of the lever, a bevel cam 61a on the leading side of the base 39 will lift the plunger and allow it to drop back into the locking position by the action of the spring 57. It is noted that the lever 38 is annularly grooved at 62 to receive a pin 63 in the base 39, permitting the twisting motion of the lever therein while locking the lever against longitudinal movement. An auxiliary means to lock the indexing assembly consists of a thumbscrew 64 whose shank 65 threads through the housing wall 10 toward the periphery of the lever ring 41. Thus, by advancing the thumbscrew the indexing mechanism may be locked for jobs requiring a brief amount of work, or only on one or two pieces. In this event a permanent indexing ring adjustment is unnecessary, since the work may be rotated or set to any desired position and locked by means of the thumbscrew.

It will be evident that the novel unit has several advantageous features. First, it secures a positive grip on the collet and its contents by dual wedge means actuated simply and easily from the outside of the unit. Further, the work support is freely rotatable when the plunger control is retracted; and the advance of the wedge does not in any way hinder the rotation of the work support. Further, the work support can be given partial rotation and independently locked by means of the thumbscrew 64. Further, both the plunger control and the lever locking the work support to the housing are in a single assembly and operable jointly or separately by the hand holding the same. Further, the chuck has a two-part housing which may be readily opened for attention or repair to parts or the removal or adjustment of the same. Finally, the chuck is of rugged and compact nature, and adapted for application in either a vertical or horizontal position to machines in which it is to be used.

While I have described the invention along specific lines, various minor changes or refinements may be made therein without departing from its principle, and I desire to consider such changes and refinements as coming within the scope and spirit of the appended claims.

I claim:

1. A chuck comprising a housing, a contractible work-engaging generally cylindrical collet rotatably supported in the housing, a sleeve surrounding the collet and mounted in the housing for axial movement relative thereto, cooperating cam means supported by the collet and sleeve for contraction of the collet upon axial movement of the sleeve, a wedge ring surrounding the sleeves and confined to axial movement therewith, an elliptical wedge ring surrounding the sleeve and cooperating with the first wedge ring, means supporting the elliptical wedge ring from the housing for movement transversely of the axis of the sleeve; and means for selectively rotating and securing the collet about its axis in said housing.

2. A chuck comprising a housing, a contractible work-engaging generally cylindrical collet rotatably supported in the housing, means for contracting the collet, a notched ring surrounding the collet and supported for rotation therewith, a lever supported by the housing for movement about the axis of the collet, and retractible detent means supported by the lever for selective engagement in the notches of the ring.

3. A chuck comprising a housing, a sleeve supported in the housing for axial movement relative thereto, a contractible work engaging collet disposed within the sleeve and having a flared head, wedge means supported by the sleeve cooperating with the flared head for contraction of the collet upon axial movement of the sleeve, a wedge ring surrounding the sleeve and confined to axial movement therewith, and an elliptical wedge ring surrounding the sleeve in operative engagement with the first wedge ring and supported for movement transversely of the axis of the sleeve for moving same axially upon movement of the elliptical wedge ring.

4. A chuck according to claim 3 wherein said sleeve together with the collet are supported within the housing for rotation about their axes, and means for rotating the sleeve about its axis and for locking same in any position of rotation.

5. A chuck comprising a housing including a lathe engaging base, a head piece secured to the housing, a retainer ring supported in the head piece, a sleeve supported within the housing for rotary and axial movement, a beveled ring secured to said sleeve in bearing engagement with the inner wall of said retainer ring, a split contractible work engaging collet supported within said sleeve for rotation therewith, means on the retainer ring for restraining the collet against axial movement, said collet having a beveled head engageable with said beveled ring for contraction of the collet upon axial movement of the sleeve, a spring disposed between said retainer ring and said sleeve for yieldably resisting axial movement thereof, a cam ring surrounding said sleeve, means confining said cam ring for axial movement with the sleeve, a second cam ring surrounding the sleeve and cooperating with said first cam ring, and means supporting said second cam ring for movement transversely to the axis of said sleeve.

6. A chuck according to claim 5 wherein said confining means comprises a flange on one end of the sleeve, an indexing ring keyed to said flange, and a bearing assembly disposed between the indexing ring and said first cam ring.

7. A chuck according to claim 5 together with means supported by the sleeve and cooperating means supported by the housing for rotating said sleeve about its axis.

8. A chuck according to claim 5 wherein said retainer ring includes a flange engaged by said spring, and a bearing assembly between said flange and said head piece.

9. A chuck comprising a housing, a sleeve rotatably supported in said housing, a contractible work engaging collet supported within said sleeve for rotation therewith, means for contracting said collet, a ring keyed to said sleeve and provided with a plurality of circumferentially spaced notches, a lever supported by said housing for limited circumferential movement about the axis of said sleeve, releasable spring pressed detent means supported by said lever for selective engagement in said notches for stepped rotation of the sleeve upon oscillating movement of the lever, and means for locking the lever against movement relative to the housing in any rotary adjustment of the sleeve with said detent means engaged in a notch in said ring.

10. A chuck according to claim 9 wherein said lever is secured to a second ring rotatable about the first ring, and an aperture in said second ring receiving said detent means.

WILLIAM V. BAULT.

REFERENCES CITED

The following references are of record in the file of this patent:

UNITED STATES PATENTS

| Number | Name | Date |
| --- | --- | --- |
| 814,648 | Hanson | Mar. 6, 1906 |
| 1,252,335 | Foote | Jan. 1, 1918 |
| 1,260,130 | Bemis | Mar. 19, 1918 |
| 1,263,270 | Millholland | Apr. 16, 1918 |
| 1,946,158 | Gorg | Feb. 6, 1934 |
| 1,987,726 | Wilkerson et al. | Jan. 15, 1936 |
| 2,335,721 | Zagar | Nov. 30, 1943 |